Patented Apr. 9, 1929.

1,708,743

UNITED STATES PATENT OFFICE.

FRANZ SKAUPY, OF LICHTERFELDE, BERLIN, HEINZ NACHOD, OF BERLIN, AND GEORG GAIDIES, OF PANKOW, BERLIN, GERMANY, ASSIGNORS TO GENERAL ELECTRIC COMPANY, A CORPORATION OF NEW YORK.

VITREOUS COMPOSITION.

No Drawing. Application filed December 1, 1926, Serial No. 152,054, and in Germany May 11, 1926.

The invention concerns easily fusible vitreous compositions, such as glazes or enamels, which may be used especially as coating for glass bodies, as for instance, glass bulbs of incandescent lamps. Compositions of this kind (sometimes known as "glasses") are characterized chiefly by the fact that they possess a low fusing temperature and a low coefficient of expansion and that they are as colorless as possible when they are to be modified by addition materials so as to be rendered white or colored.

Different glasses are already known which may be used as coating for lamp bulbs, as for instance, low fusing lead borates and lead borosilicates with all kinds of admixtures for coloring or clouding the basic glass. The easy fusibility of all these glasses, however, was obtained mainly by a high percentage of lead oxide which always entailed a relatively high coefficient of expansion and also a certain yellowish coloring of the glass. This yellowish coloring in pure white enamels cannot be eliminated even by use of intensively active white substances, and still less satisfactory results are obtained by using decolorizing substances. Nor can the coefficient of expansion be made small enough by admixture of other compounds without increasing considerably the fusing temperature at the same time.

According to the present invention it was determined that the desired condidtions are fulfilled by basing the manufacture of transparent or opaque coatings on a lead zincborate of a definite composition. The newly discovered compound contains by weight the following ingredients:

60 to 75% lead oxide, PbO;
10 to 25% zinc oxide, ZnO;
15 to 30% boric anhydride, $B_2O_3$.

These zinc borates may be colored and clouded by different admixtures, either directly when being fused, or indirectly when being pulverized, in order to obtain all the different effects as they are known in the glass and ceramic industries.

The following composition within the mentioned limits of the lead zinc borate is particularly suitable for such enamels or coatings, and which may be applied to finished electrical incandescent lamps.

65% lead oxide;
15% zinc oxide;
20% boric anhydride.

The coefficient of expansion of this coating is so low that a gas-filled incandescent lamp enameled with it does not break even when water (rain) strikes the bulb.

Various known clouding or coloring substances may be used to modify the leadzinc borate foundation material. The admixture of a low amount of arsenic and ammonium nitrate to the basic glass, however, has proved especially useful, because the addition of only 0.5% arsenic and 0.5% ammonium nitrate (which makes no essential changes in the basic glass) results in a pure white enamel of high opacity with very good diffusibility and a high coefficient of transmission. Incandescent lamps with transparent bulbs, therefore, which are coated with such white enamel after they are completely finished have the same appearance as lamps made of milky or opaque glass. Clouded and colored enamels likewise are manufactured to the best advantage by using the low additive amount of arsenic and ammonium nitrate to the basic glass, however, with the admixture of known coloring substances like chromate, bichromate, copper, cobalt and manganese compositions.

What we claim as new and desire to secure by Letters Patent of the United States is:—

1. An easily fusible composition comprising by weight about 60 to 75 parts lead oxide, 10 to 25 parts zinc oxide and 15 to 30 parts boric anhydride.

2. An easily fusible composition comprising by weight about 65 parts lead oxide, 15 parts zinc oxide, and 20 parts of boric anhydride.

3. A white enamel for incandescent lamps comprising by weight about 65 parts lead oxide, about 15 parts zinc oxide, about 20 parts boric anhydride, and about one-half part arsenic.

In witness whereof, we have hereunto set our hands this 13th day of November, 1926.

FRANZ SKAUPY.
HEINZ NACHOD.
GEORG GAIDIES.